(12) United States Patent
Rahman et al.

(10) Patent No.: US 7,630,590 B2
(45) Date of Patent: Dec. 8, 2009

(54) OPTICAL SENSOR FOR MEASURING THIN FILM DISPOSITION IN REAL TIME

(76) Inventors: Anisur Rahman, 85-57 143$^{RD}$ St., 1$^{st}$ Flr., Briarwood, NY (US) 11435; Reginald Eze, 2305 Belmont Ave., Elmont, NY (US) 11003; Sunil Kumar, 3135 Johnson Ave. #15-J, Riverdale, NY (US) 10463

( * ) Notice: Subject to any disclaimer, the term of this patent is extended or adjusted under 35 U.S.C. 154(b) by 0 days.

(21) Appl. No.: 11/979,531

(22) Filed: Nov. 5, 2007

(65) Prior Publication Data
US 2009/0116782 A1     May 7, 2009

(51) Int. Cl.
*G02B 6/00* (2006.01)

(52) U.S. Cl. .............................. 385/12; 356/38; 356/519

(58) Field of Classification Search .................... 385/12; 356/38, 519
See application file for complete search history.

(56) References Cited

U.S. PATENT DOCUMENTS 6,204,922 B1 * 3/2001 Chalmers .................... 356/630
6,278,809 B1 * 8/2001 Johnson et al. ................ 385/12
2006/0193550 A1 * 8/2006 Wawro et al. ................. 385/12
2007/0070356 A1 * 3/2007 Tan et al. ..................... 356/477

* cited by examiner

*Primary Examiner*—Daniel Petkovsek
(74) *Attorney, Agent, or Firm*—Michael J. Foycik, Jr.

(57) ABSTRACT

A novel optical sensor is used for monitoring the thickness of deposited thin film in real time. The sensor operates on the basic principle of a Fabry-Perot interferometer. A MEMS based design is used to fabricate the optical fiber sensor. Detail analytical results provide the theoretical model based on the Fabry-Perot interferometer, and show that the optical fiber sensor can successfully monitor and measure the thickness of deposited thin-film in real time. Since thin-film will be deposited simultaneously on both surfaces of sensor head and targeted silicon wafer, the sensor can be used in the fabrication of IC and MEMS devices, as well as in proteomics, nano-sensors, and biosensors.

6 Claims, 8 Drawing Sheets

Two Layer Fabry-Perot Interferometer

MAGNIFIED PLOT OF PORTION OF FIG. 4A

SPECTRUM PLOT OF REFLECTIVITY WITH VARIATION
IN THICKNESSES OF DEPOSITED THIN-FILMS
WITH 5 nm INCREMENT

SPECTRUM PLOT OF REFLECTIVITY WITH VARIATION
IN THICKNESSES OF DEPOSITED THIN FILMS
WITH 10 nm INCREMENT

SPECTRUM PLOT OF REFLECTIVITY WITH VARIATION IN THICKNESSES OF DEPOSITED THIN FILMS WITH 20 nm INCREMENT

OPTICAL SENSOR FOR MEASURING THIN FILM DISPOSITION IN REAL TIME

FIELD OF THE INVENTION

The present invention relates to measuring thin film deposition using an optical sensor. The optical sensor of the present invention is particularly useful in fabrication of deposited thin film in micro/nano technologies.

BACKGROUND OF THE INVENTION

In the production of devices for micro/nano technologies, there is a great demand for non-invasive sensors for monitoring the deposition of thickness of a film on a substrate. The substrate can, for example, be a silicon wafer.

Various types of sensors are known in the micro/nano scale fabrication arts. For example, there have been several types of optical fiber sensors reported in the technical literature for sensing different physical properties. These types includes fiber optic temperature sensors with ultra-thin silicon etalon, glucose monitoring using fluorescent microspheres, various applications with Whispering Gallery Modes (WGM) resonators, bimetallic optical temperature sensors, acceleration sensors using microsphere resonators, and optical fiber pressure sensors. Each of these reported fiber optic sensors has its own advantages and disadvantages.

The aforementioned reported fiber optic sensors have various types of sensing capabilities and qualities. However, these have not found widespread industrial application due to their design complexity and high production costs, or because they may be invasive for a given application.

The quality of integrated circuit (IC) and micro-electromechanical system (MEMS) devices are mostly depend on efficient control of thin film deposition upon a substrate. Device performance and characteristics are gradually improving as active research is applied to thin film deposition and more accurate monitoring of the film thickness. Such monitoring includes direct optical monitoring of thickness and refractive index, an end-point detector for parylene deposition, an optical fiber sensor to monitor polymer growth, optical monitoring of thin-film deposition, optical monitoring of thin-films with spectroscopic ellipsometry, and an evanescent wave sensor to monitor the deposition rate of thin-films. However, efficient monitoring of thin film deposition rate and thickness are still a great challenge in thin film industries.

There is accordingly a demand for optical sensor technology for monitoring thin film deposition, which is non-invasive, relatively easy to fabricate, relatively easy to use, and having relatively low production costs.

SUMMARY OF THE INVENTION

From the foregoing, it is seen that it is a problem in the art to provide a device meeting the above requirements. According to the present invention, a device and process are provided which meets the aforementioned requirements and needs in the prior art. Specifically, the device according to the present invention provides an optical sensor which is non-invasive, relatively easy to fabricate, relatively easy to use, and having relatively low production costs.

More particularly, the invention relates to an optical sensor fabricated directly on a multimode optical fiber end face. The sensor includes a layer of silicon wafer fabricated such that its diameter is the same as that of the optical fiber. The deposition of a film layer on the silicon wafer is measured optically using the principles of Fabry-Perot interferometer theory.

Furthermore, the aforementioned novel optical sensor is a MEMS based optical fiber sensor. The optical sensor of the invention can be fabricated in arrays of optical fibers, so that large scale production is possible.

Other objects and advantages of the present invention will be more readily apparent from the following detailed description when read in conjunction with the accompanying drawings.

DETAILED DESCRIPTION OF THE INVENTION

Figure 1:
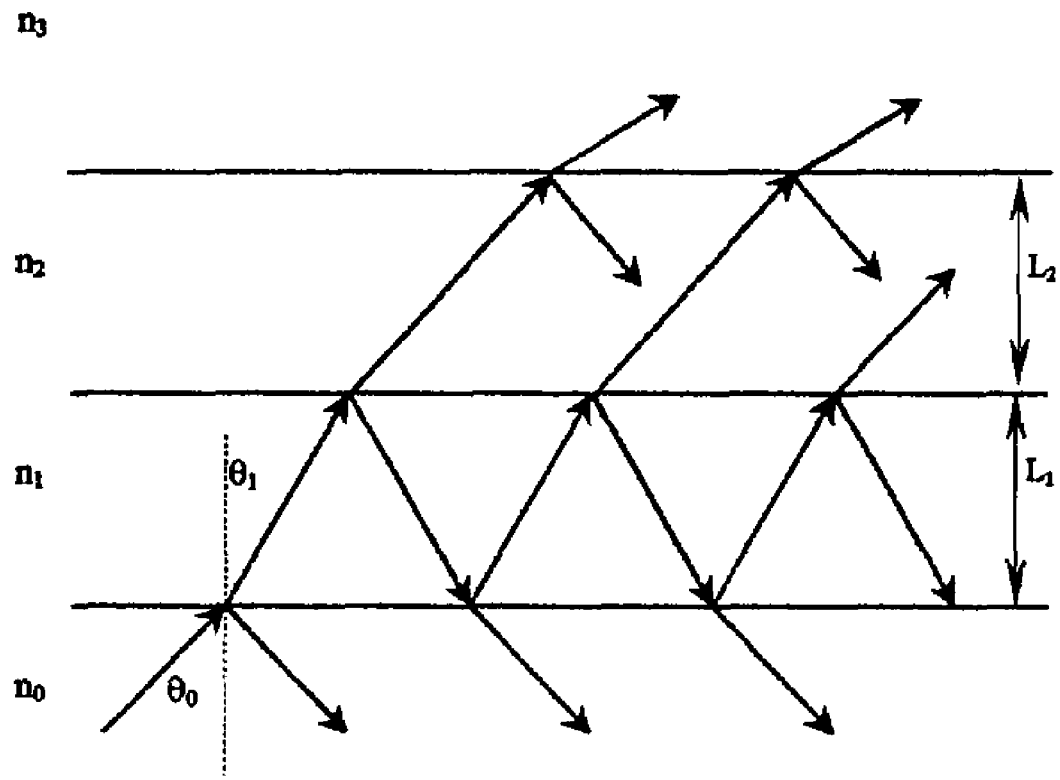
FIG. 1 is a schematic perspective view of a Fabry-Perot interferometer, the principles of operation thereof being used in the present invention, showing optical paths for a thin film layer and a substrate layers.

FIG. 1 is a schematic perspective view of a Fabry-Perot interferometer, the principles of operation thereof being used in the present invention, showing optical paths for a thin film layer and a substrate layers.

In FIG. 1 is shown the reflection, refraction and transmission of light from a typical Fabry-Perot interferometer having thin-film thicknesses $L_1$ & $L_2$ and refractive indexes $n_1$ (Silicon wafer) & $n_2$ (deposited thin film), respectively, also known as etalon. For a typical single layer Fabry-Perot interferometer having a film thickness L, the amplitude reflectance of the film is [16]

$$r_F = r_{01} + t_{01}t_{10}r_{12}e^{i2\Omega}(1 + r_{10}r_{12}e^{i2\Omega} + r_{10}^2r_{12}^2e^{i4\Omega} + \ldots) \quad \text{(EQN. 1)}$$

where $$\Omega = \frac{2\pi}{\lambda}n_1 L\cos\theta_1,$$

and further simplification yields a simple expression of reflectance for two layers Fabry-Perot interferometer (FIG. 1), $$r_F = \frac{-r_{10} + r_{123}e^{i2\Omega_1}}{1 - r_{10}r_{123}e^{i2\Omega_1}} \quad \text{(EQN. 2)}$$

$$\text{where } r_{123} = \frac{-r_{21} + r_{23}e^{i2\Omega_2}}{1 - r_{21}r_{23}e^{i2\Omega_2}} \quad \text{(EQN. 3)}$$

$$\Omega_1 = \frac{2\pi}{\lambda}n_1 L_1 \cos\theta_1 \quad \text{(EQN. 4)}$$

$$\Omega_2 = \frac{2\pi}{\lambda}n_2 L_2 \cos\theta_2 \quad \text{(EQN. 5)}$$

$$r_{jk} = \frac{n_j - n_k}{n_j + n_k} \quad \text{(EQN. 6)}$$

Then the reflectivity of the thin-film is $$R_F = |r_F|^2 \quad \text{(EQN. 7)}$$

Figure 2:
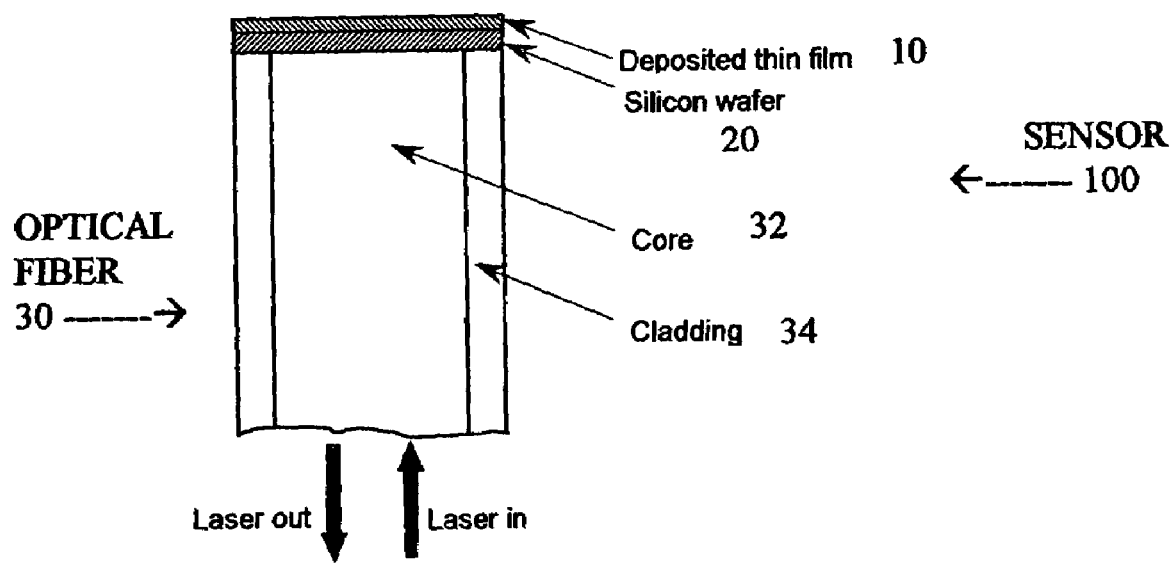
FIG. 2 is a schematic side view of an optical sensor using the Fabry-Perot interferometric method of FIG. 1, depicting a substrate deposited on one end of an optical fiber having a core and cladding, wherein a deposited thin film overlies the substrate.

Nomenclature
L=thin-film thickness
n=refractive index
r=reflectance of the thin-film
R=reflectivity of the thin-film
t=transmittance of the thin-film
$\lambda$=wavelength of light, (m)
$\theta$=incident angle
$\delta$=surface roughness
$\kappa$=optical losses Subscripts
0=inside fiber core
1=inside silicon wafer
2=inside deposited thin-film
3=outside the sensor head
01, 10=reflectance between layers 1 & 0
12, 21=reflectance between layers 2 & 1
23, 32=reflectance between layers 2 & 3
123=reflectance between layers 1, 2 & 3
F=film
i=imaginary number
j=integer and represent $j^{th}$ term
k=integer and represent $k^{th}$ term FIG. 2 is a schematic side view of an optical sensor 100 using the Fabry-Perot interferometric method of FIG. 1, depicting a substrate 20 deposited on one end of an optical fiber 30 having a core 32 and cladding 34, wherein a deposited thin film 10 overlies the substrate 20.

In the device of FIG. 2, the substrate 20 can be, for example, a silicon wafer. The optical fiber 30 is, for example, a commercially available borosilicate optical fiber. The optical sensor 100 is fabricated directly on an end face of a multimode optical fiber 30 which will eliminate the need for adhesive in packaging. A unique feature of the optical sensor 100 is that the fabrication will be done on a commercial borosilicate optical fiber. Since the sensor 100 is fabricated at the end of the fiber 30, the diameter of the sensor 100 will be the same diameter as that of the fiber 30. The sensor 100 could be fabricated as sensor arrays for micro level applications.

In the device of FIG. 2, a silicon wafer 20 having refractive index $n_1$=3.46 and thickness $L_1$=4 μm, is anodically bonded on the end face of the optical fiber 30 whose core & cladding diameters are 190 μm & 200 μm, respectively. The refractive index of the core 32 is $n_0$=1.5098. The interface between the silicon wafer 20 and the fiber core 32 will act as a first reflector. The thin-film 10 will be deposited on top of the Si wafer 20 and hence, the deposited thin-film 10 and the silicon wafer 20 will serve as a second reflector. When a laser beam travels through the fiber core 32, these reflectors will act as a Fabry-Perot interferometer and the reflected portion of the laser beam will travel back through the same fiber core 32. As soon as the deposited thin-film starts to grow, the second reflector will be activated and the reflectivity of the Fabry-Perot interferometer will change and continue until the deposition stops. As thin-film thickness increases continuously, the shift in reflectivity spectrum will continue to change with respect to wavelength and time.

Measuring the thickness of thin film deposition for micro/nano fabrication in real time is a great challenge. The optical sensor 100 of the present invention can be used to measure the thickness of deposited thin film during micro/nano fabrication in real time. As discussed hereunder, a theoretical and numerical model has been presented to characterize the principles of operation of the optical sensor 100 of the present invention. The sensor 100 is modeled with a multimode optical fiber, and the well known Fabry-Perot interferometer principle is used to describe the operational characteristics of the optical sensor 100. The sensor 100 can be used, for example, to measure the thickness of thin film deposition as small as molecular dimensions (i.e., $10^{-10}$ m) and can be used in the fabrication of Micro-Electro-Mechanical System (MEMS) devices and in the fabrication of surface plasmon devices, as well as in biomedical applications, nano research, and other fields.

The advantages of the optical fiber sensor 100 are numerous. These advantages, as compared with other conventional sensors, are that the optical fiber sensors are lightweight, have immunity to electromagnetic interference (EMI), and have small size, high sensitivity, large bandwidth, capability of operating at high temperature, and capability of remote operation.

Figure 3:
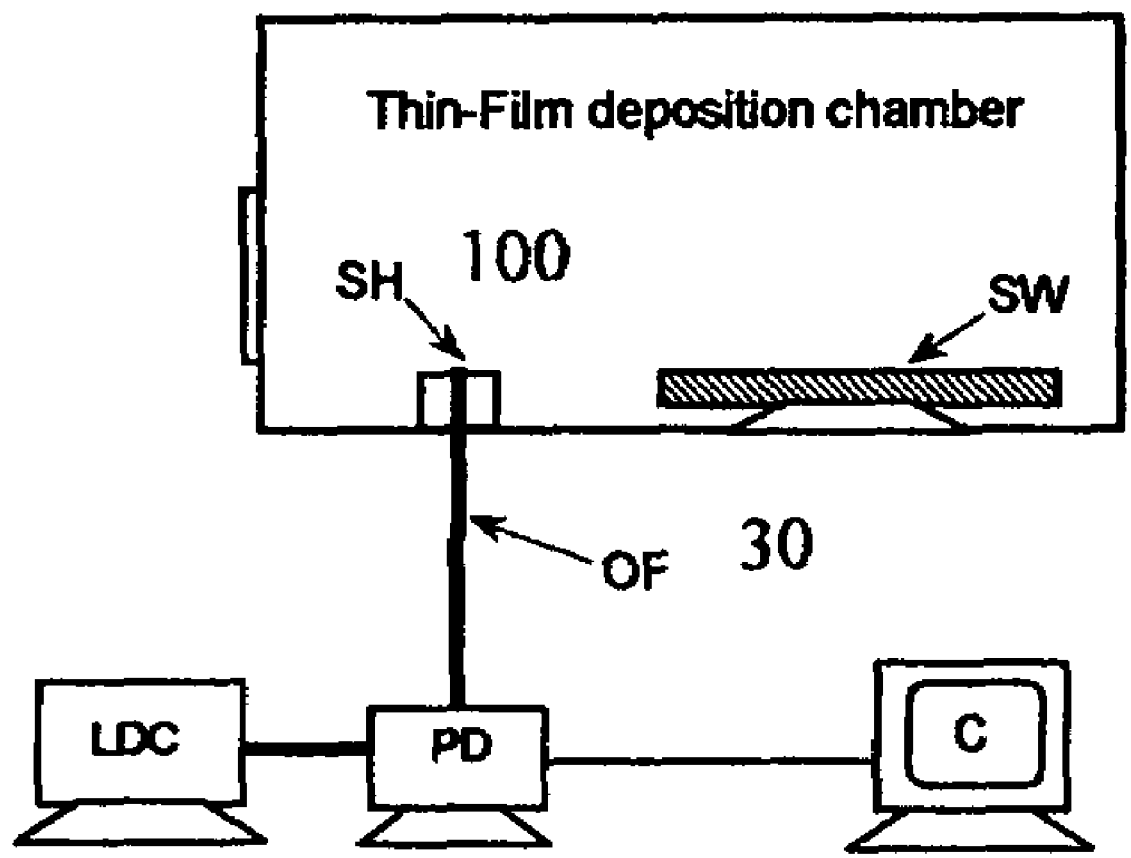
FIG. 3 is a schematic view of an optical monitoring apparatus for monitoring thin film deposition on a substrate inside a thin film deposition chamber, wherein the optical sensor is schematically shown inserted into the chamber.

FIG. 3 is a schematic view of an optical monitoring apparatus for monitoring thin film deposition on a substrate inside a thin film deposition chamber, wherein the optical sensor 100 is schematically shown inserted into the chamber with the optical fiber 30 extending outside of the chamber. In FIG. 3, C indicates a computer, LDC indicates a laser diode controller, OF indicates the optical fiber 30, PD indicates a photodetector, SH indicates the sensor head 100, and SW indicates a silicon wafer 20.

As mentioned above, FIG. 3 shows a schematic of an optical monitoring setup to detect the deposition thickness of thin-film. The sensor head 100 is fabricated by anodically bonding a very thin silicon wafer on top of an optical fiber end face. When the deposition process starts, a thin film will start to grow simultaneously on the surface of the silicon wafer SW as well as on the silicon wafer 20 of the sensor head 100. Note that the silicon wafer SW is separated spatially from the sensor head 100. Due to the simultaneous deposition, the same amount of material will be deposited on the surfaces of both the silicon wafer SW and the sensor head 100, and hence the thickness of the deposited film will be same for any given time limit. Since the sensor head is fabricated directly on a multimode optical fiber end face, it has the following advantages over conventional sensors:

i) Directly monitoring the thickness in real time,
ii) Measuring the thickness directly from fiber,
iii) Non-invasive sensing,
iv) Relatively very easy fabrication process, and
v) Detecting the thickness as small as 10 Å.

Fabrication Process

The optical fiber sensor 100 can be fabricated by using conventional MEMS fabrication. Commercially available borosilicate glass fiber is chosen to fabricate the sensor, wherein the glass fiber has core and cladding diameters which are 190 μm and 200 μm, respectively. One end of a multimode optical fiber, made of borosilicate, will be polished to make it optically smooth and having a flat surface. Then, a very thin silicon wafer will be attached on top of the polished fiber end face by using anodic bonding technique. After bonding, the fiber end face is ready to be used inside the thin-film deposition chamber as a sensor head for measuring the deposited thin-film thickness in real time.

Figure 4A:
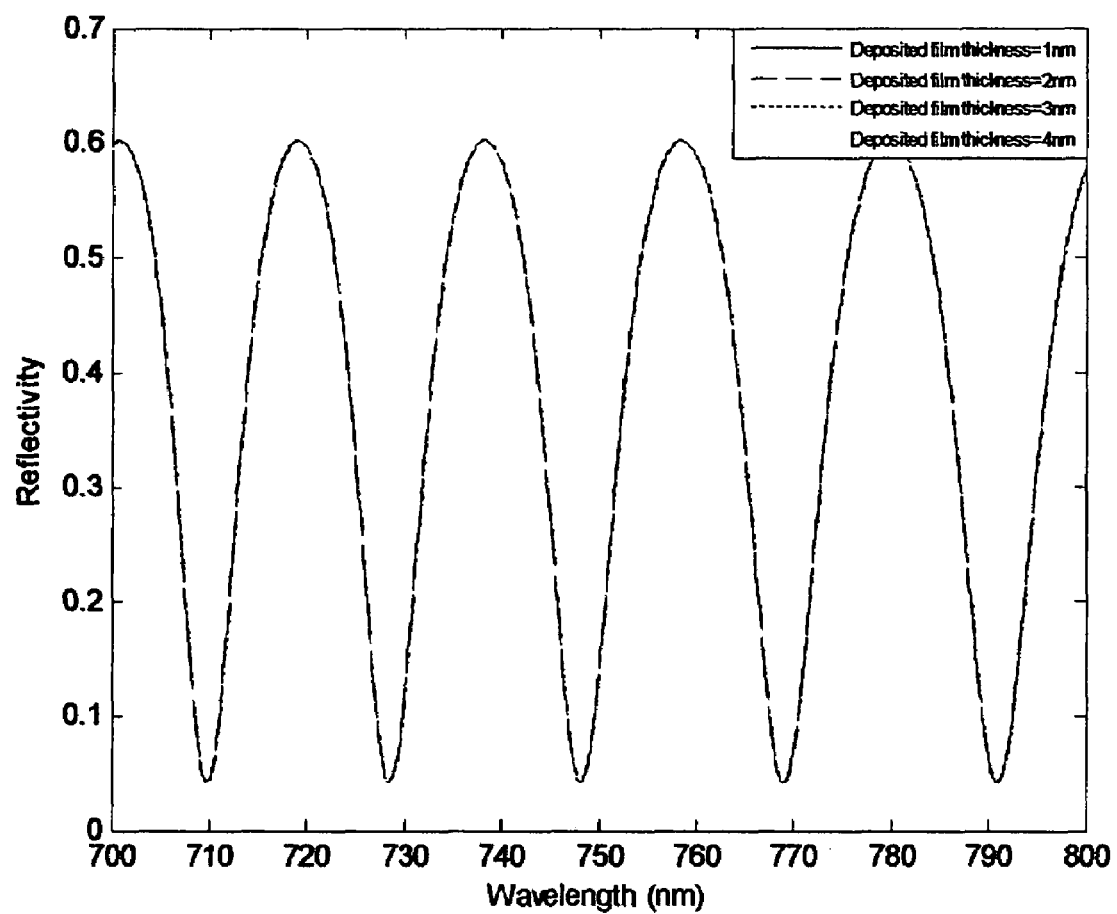
FIG. 4A is a spectrum plot of reflectivity with the variation in thicknesses of deposited thin-films with 1 nm to 10 Angstroms increments.

FIG. 4A is a spectrum plot of reflectivity with the variation in thicknesses of deposited thin-films with 1 nm to 10 Angstroms increments. As discussed hereinabove, the reflectivity spectrum will change continuously during the deposition process due to increase in thickness of deposited thin film. Using EQN (7), analytical reflectivity is calculated for different thicknesses of deposited thin-films.

FIG. 4A shows the shift in wavelength of reflectivity-spectrum due to changes in thickness of the deposited thin-film. Here, there is considered the very thin-film deposition such as 1 nm or 10 Å and changes in the thickness with 1 nm or 10 Å increments. The theoretical calculated results show that the sensor 100 can monitor very narrow thicknesses of deposited thin-film, for example as small as 10 Å. This is shown more clearly in FIG. 4(b).

Figure 4B:
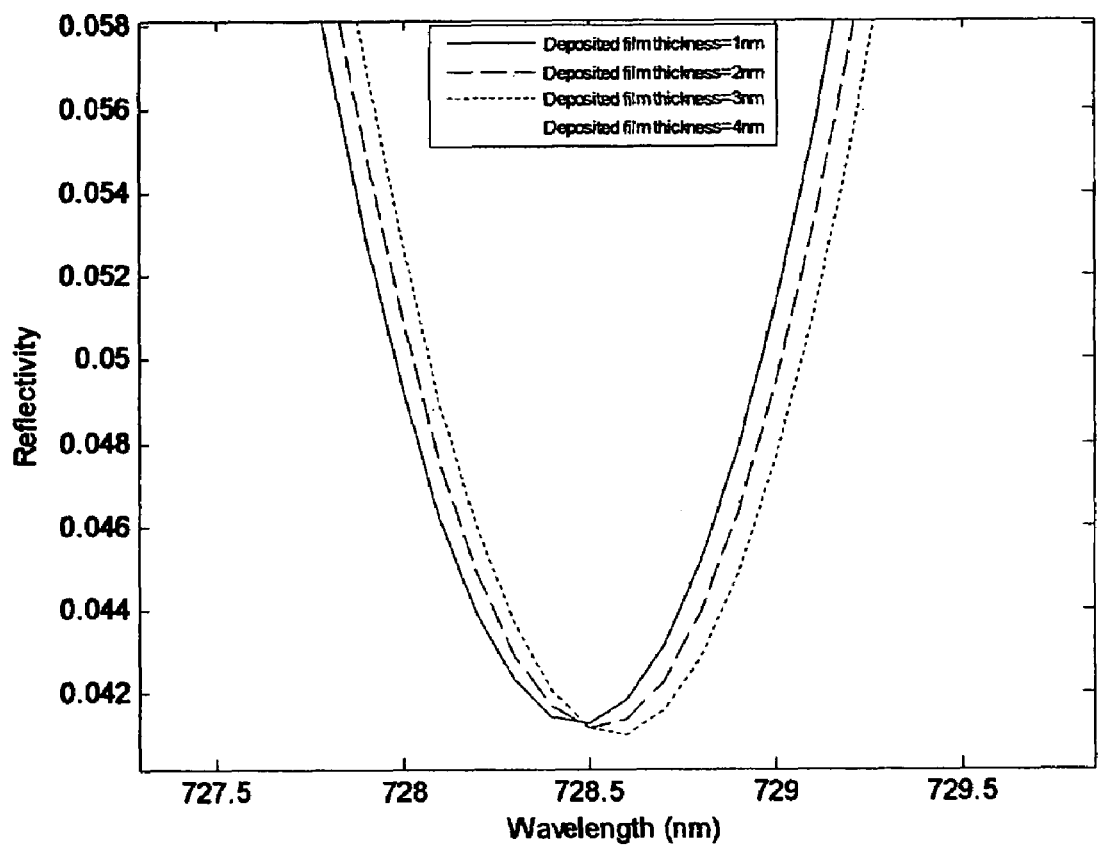
FIG. 4B is a greatly enlarged view of a portion of the spectrum plot of FIG. 4A, of reflectivity with the variation in thicknesses of deposited thin-films with 1 nm to 10 Angstroms increments.

FIG. 4B is a greatly enlarged view of a portion of the spectrum plot of FIG. 4A, of reflectivity with the variation in thicknesses of deposited thin-films with 1 nm to 10 Angstroms increments.

Figure 5:
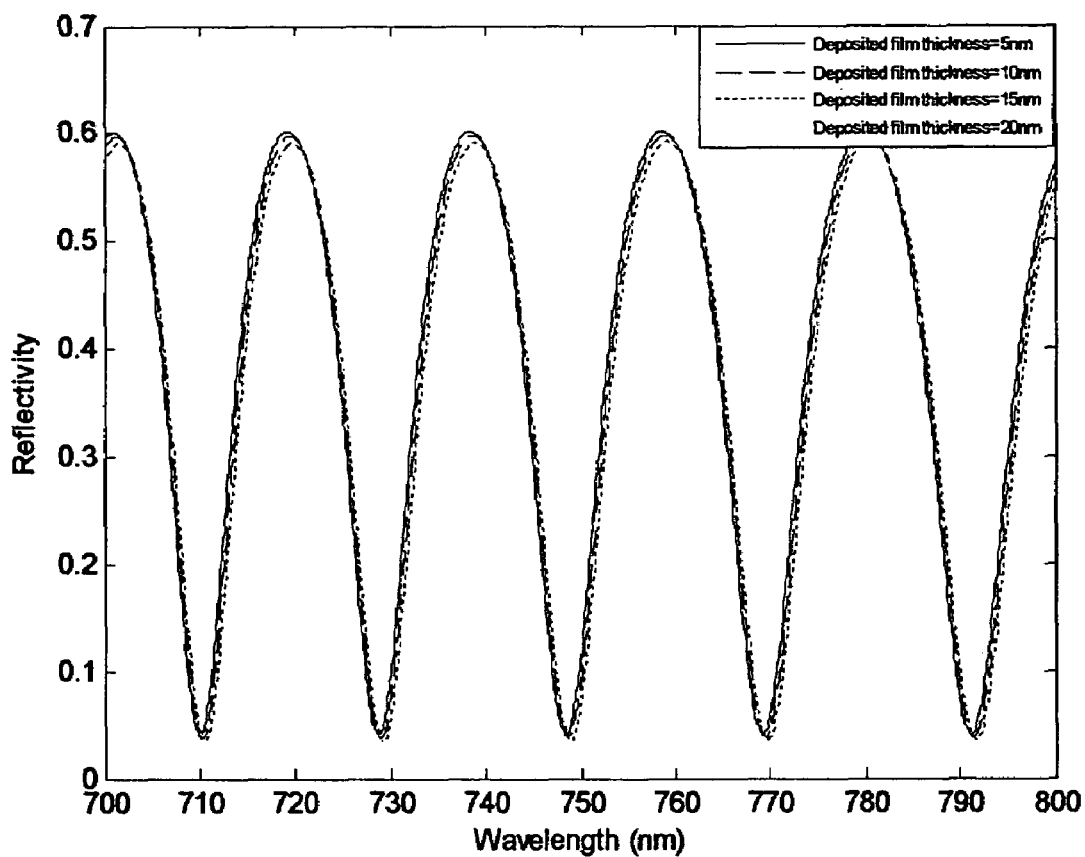
FIG. 5 is a spectrum plot of reflectivity with the variation in thicknesses of deposited thin-films with 5 nm increments.

FIG. 5 is a spectrum plot of reflectivity with the variation in thicknesses of deposited thin-films with 5 nm increments. In FIG. 5, the thickness increase with 5 nm increments and the spectrum shift in wavelength are clearly visible as thicknesses varying during the deposition process.

Figure 6:
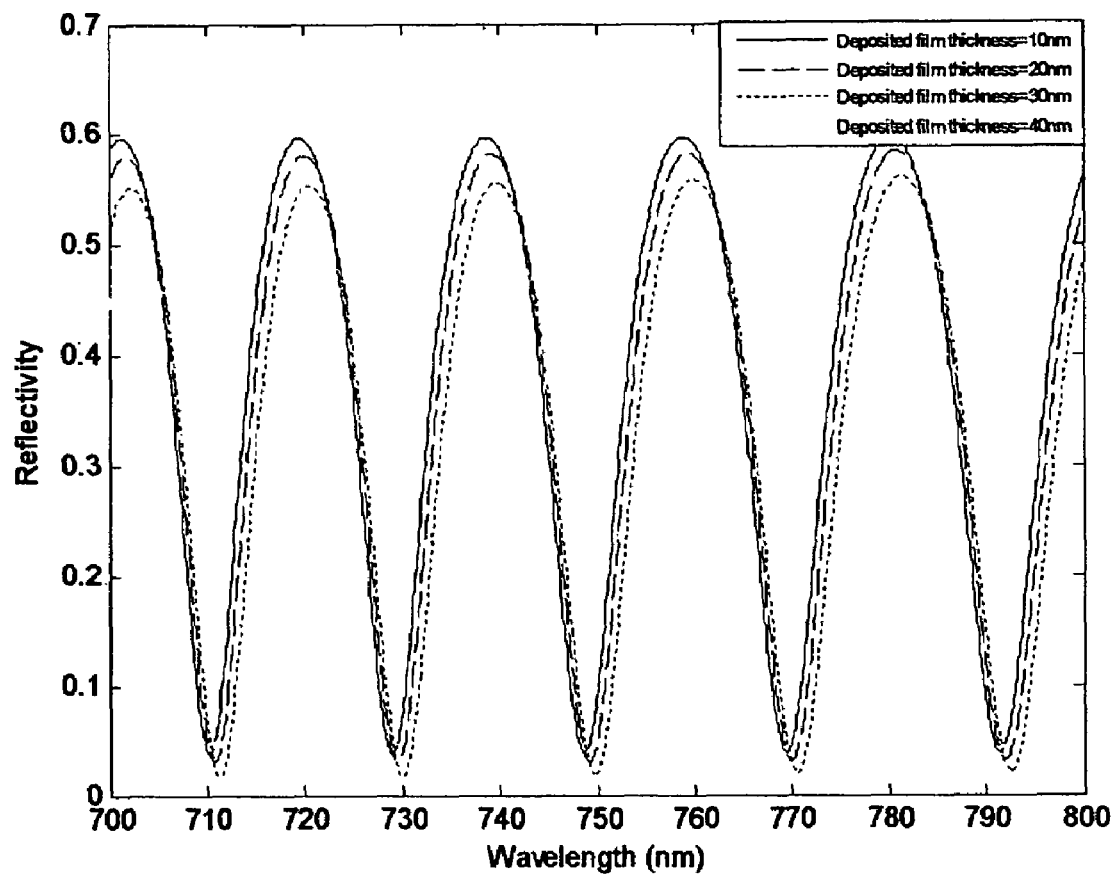
FIG. 6 is a spectrum plot of reflectivity with the variation in thicknesses of deposited thin-films with 10 nm increments.
Figure 7:
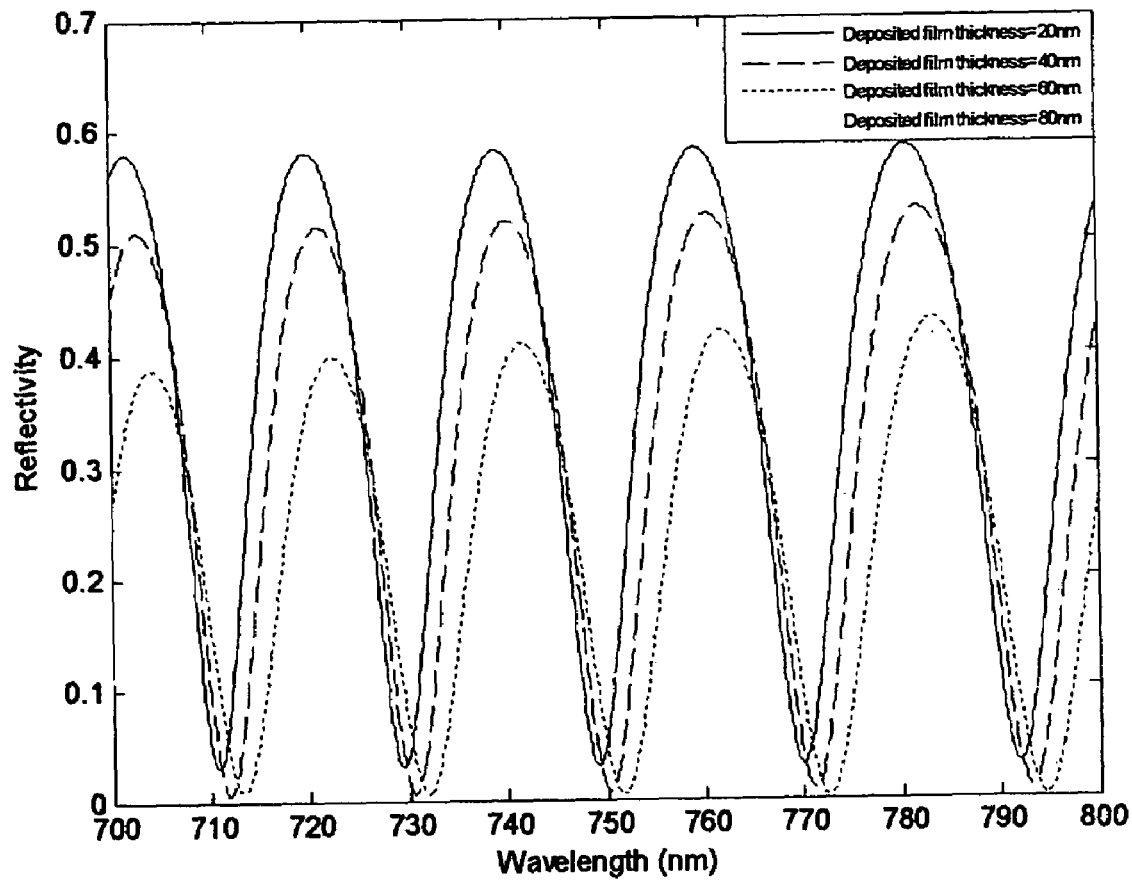
FIG. 7 is a spectrum plot of reflectivity with the variation in thicknesses of deposited thin-films with 20 nm increments.

FIG. 6 is a spectrum plot of reflectivity with the variation in thicknesses of deposited thin-films with 10 nm increments. FIG. 7 is a spectrum plot of reflectivity with the variation in thicknesses of deposited thin-films with 20 nm increments.

In FIGS. 6 and 7, the thickness increases with 10 nm and 20 nm increments, respectively. The reflectively-spectrum shifts in wavelength are significantly visible as thicknesses increasing. From FIGS. 4 to 7, it is evident that as thickness of deposited thin-film grows larger, the wavelength shift of reflectivity spectrum becomes inconsistent. FIG. 7 is more inconsistent than FIG. 4. This inconsistency exists mostly because of increase in roughness with the increase in thickness of deposited thin-film. So it is also necessary to consider the roughness and other optical losses to detect the thickness more precisely. The calculated extreme will be different from those given in Eqn. (7) due to surface roughness δ and optical losses κ and root mean square values of these two parameters can be calculated by following expressions, $$\delta = \frac{1}{k}\left[\frac{1}{2}\ln\left(\frac{2r_{01}}{\sqrt{R_{min}} + \sqrt{R_{max}}}\right)\right]^{\frac{1}{2}} \quad (8)$$

$$\kappa = \frac{1}{2kL}\left\{\ln\left[\frac{1}{2}\ln\left(\frac{2r_{12}(1-r_{01}^2)}{\sqrt{R_{min}} + \sqrt{R_{max}}}\right)\right] - (1-n)^2\ln\left(\frac{2r_{01}}{\sqrt{R_{min}} + \sqrt{R_{max}}}\right)\right\} \quad (9)$$

The main design parameters, cavity depth, i.e., thickness of silicon wafer, fiber core diameter and fiber length can be varied to obtain a linear response. Since the reflected light from deposited thin-film is related to refractive index change in the silicon wafer cavity, the detection is based on the spectrally shifted of reflected light. Here, while the above discussion relates to the monitoring of the thickness of deposited thin-film inside the thin-film deposition chamber in real time, it is noted that the reflectivity-spectrum plot could also be presented against real time.

The invention being thus described, it will be evident that the same may be varied in many ways. Such variations are not to be regarded as a departure from the spirit and scope of the invention and all such modifications are intended to be included within the scope of the claims.

What is claimed is:

1. An optical fiber sensor for measuring thickness of a deposited thin film having a thickness of approximately 1 nanometer, comprising:
   an optical fiber having an optically flat end surface;
   a flat thin layer film having a thickness of approximately 4 micrometers in facing contact with the optically flat end surface;
   whereby light entering through the optical fiber is partially reflected back into the optical fiber by the flat thin layer film depending upon an amount of deposited thin film on the flat thin layer film.

2. An optical fiber sensor as claimed in claim 1, wherein the flat thin layer film having a thickness of approximately 4 micrometers and deposited thin film having a thickness of approximately 1 nanometer act to reflect light according to the Fabry-Perot interferometric principle.

3. An optical fiber sensor as claimed in claim 1, wherein the optical fiber has a core for carrying laser light, and cladding surrounding the core.

4. An optical fiber sensor as claimed in claim 3, wherein the optical fiber is a multimode optical fiber.

5. An optical fiber sensor as claimed in claim 4, wherein the optical fiber is borosilicate optical fiber.

6. An optical fiber sensor as claimed in claim 1, wherein the flat thin layer film is a silicon wafer fabricated directly on the flat end surface of the optical fiber.

* * * * *